United States Patent [19]
Mann et al.

[11] Patent Number: 5,251,878
[45] Date of Patent: Oct. 12, 1993

[54] DRIVE FOR LIFTING EQUIPMENT

[75] Inventors: Egon Mann, Friedrichshafen; Erwin Meisinger, Hauzenberg, both of Fed. Rep. of Germany

[73] Assignee: Zahnradfabrik Friedrichshafen AG, Fed. Rep. of Germany

[21] Appl. No.: 623,959

[22] PCT Filed: May 20, 1989

[86] PCT No.: PCT/EP89/00556
§ 371 Date: Nov. 27, 1990
§ 102(e) Date: Nov. 27, 1990

[87] PCT Pub. No.: WO89/11436
PCT Pub. Date: Nov. 30, 1989

[30] Foreign Application Priority Data
May 28, 1988 [DE] Fed. Rep. of Germany ....... 3818153

[51] Int. Cl.[5] .............. B66D 1/22; F16H 1/46
[52] U.S. Cl. ..................... 254/344; 475/344
[58] Field of Search ............. 475/344, 331, 332, 343, 475/348; 254/342

[56] References Cited
U.S. PATENT DOCUMENTS

| | | | |
|---|---|---|---|
| 3,160,026 | 12/1964 | Rosen | 475/344 |
| 3,245,279 | 4/1966 | Baker | 475/344 |
| 3,323,779 | 6/1967 | Burnett | 254/344 |
| 3,370,832 | 2/1968 | Spyridakis | 254/344 |
| 3,885,656 | 5/1975 | Michling et al. | 254/344 |
| 4,106,366 | 8/1978 | Altenbokum | 475/344 |
| 4,380,274 | 4/1983 | Abraham | 475/343 |
| 4,391,163 | 7/1983 | Benthake et al. | 475/344 |
| 4,408,746 | 10/1983 | Marsch et al. | 254/344 |
| 4,736,929 | 4/1988 | McMorris | 254/344 |
| 4,854,547 | 8/1989 | Aliphant | 254/344 |

FOREIGN PATENT DOCUMENTS 1516473  3/1968 France .
2169429  9/1973 France .
2102096  1/1983 United Kingdom .

Primary Examiner—Katherine Matecki
Attorney, Agent, or Firm—Davis, Bujold & Streck

[57] ABSTRACT

To improve the smoothness in running in a lifting equipment drive having an engine, one brake and one multi-stage planetary transmission, the input planetary gear set is helical cut and the second planetary gear set is straight cut. In addition, the input shaft is divided between the sun gear of the input planetary gear set and the brake by a clutch with a longitudinal balance, and the input shaft portion on the side of the sun gear is supported over a fixed ball bearing in the planet carrier of the second planetary gear set. By disconnecting the planetary transmission from the brake and the drive stimulations to vibrations are avoided.

7 Claims, 1 Drawing Sheet

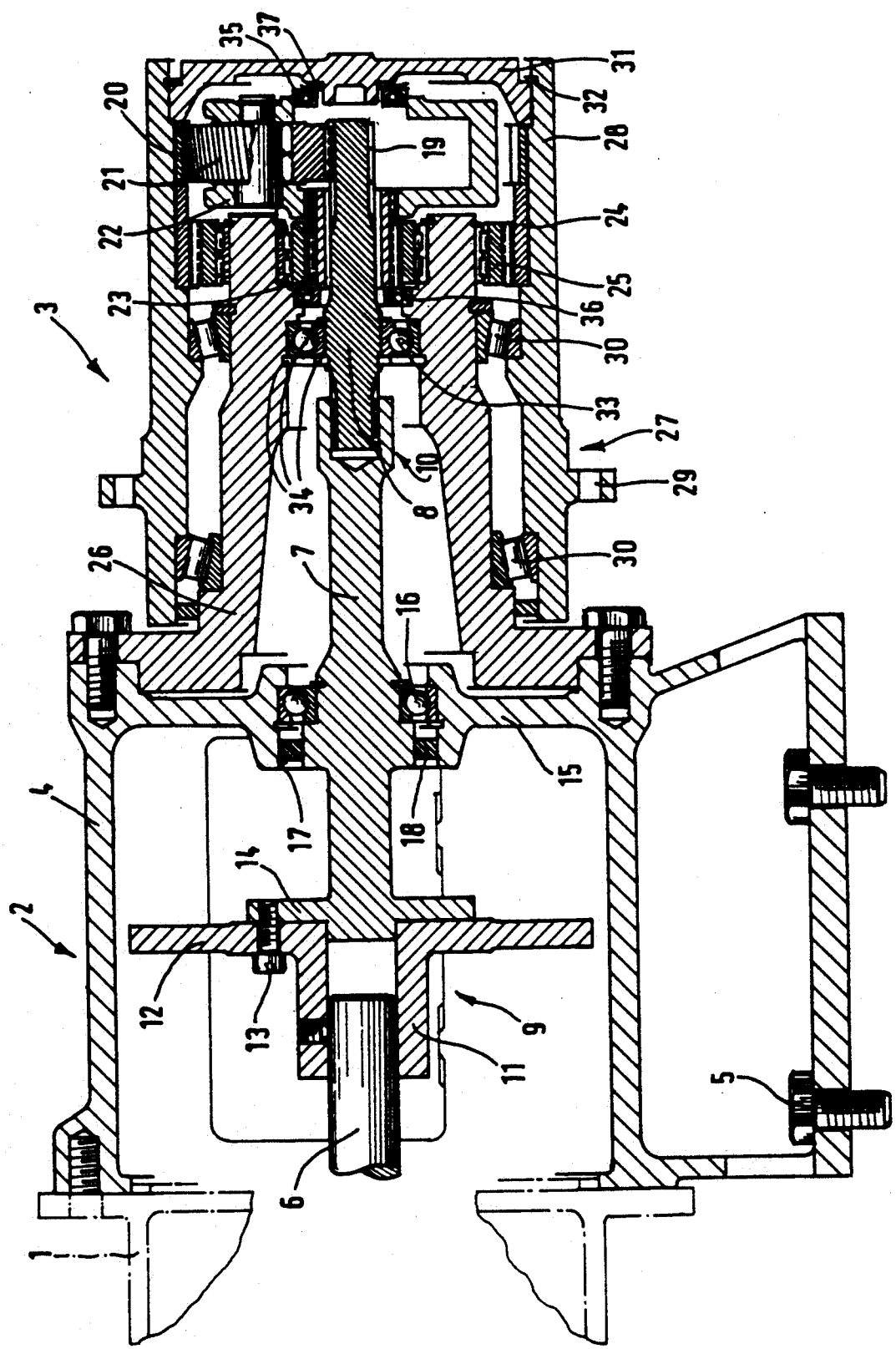

DRIVE FOR LIFTING EQUIPMENT

BACKGROUND OF THE INVENTION

The invention concerns a lifting equipment drive including a brake and an engine which drives, via an input shaft, a sun gear of an input planetary gear set of a multi-stage planetary transmission. A planet carrier of the input planetary gear set is fixedly connected with a sun gear of a second planetary gear set, while ring gears of the input planetary gear set and of the second planetary gear set are connected with a housing case. The latter is rotatably supported over bearings upon a stationarily held planet carrier of the second planetary gear set.

SUMMARY OF THE INVENTION

Therefore, the problem to be solved by the invention is to improve the noise emission of a lifting equipment drive of the kind descried above while preserving the favorable efficiency and yet to keep low the building cost. According to the invention, said problem is solved by the fact that the input planetary gear set is helical cut and the second planetary gear set is straight cut, that the input shaft between the sun gear of the input planetary gear set and the brake, which is placed between the engine and the planetary transmission, is divided by a clutch with longitudinal balance and the portion of the input shaft on the side of the sun gear is supported via a fixed ball bearing in the planet carrier of the second planetary gear set.

The helical cut of the input planetary gear set reduces the running noises which appear mainly in this transmission stage with high speed and small torques. As a consequence of the small torques, no great axial thrusts occur on the input shaft or on the ring gear due to the helical cut so that the axial support can be simply designed. As result of the low speed level, the second planetary gear set produces only slight running noises so that the difference between an expensive helical cut and the simpler straight cut is not of great importance from the point of view of noise. The straight cut produces no axial thrust and thus requires no special axial support.

According to an embodiment, the advantage can be further increased by the fact that only the gears of the second planetary gear set are finished by a heat treatment at high temperatures such as hardening. The input planetary gear set must at most be finished at low temperatures. Thereby appear in the input planetary gear set small distortions which without refinishing result in a higher precision and therefore smoother running. At the same time only a small production cost is needed. The second planetary gear set is straight cut. The manufacturing imprecisions in the slowly running second planetary gear set cause only a small emission of noises which can be further reduced by slight mechanical finishing.

The clutch with a longitudinal balance in the input shaft prevents vibrations from being transmitted from the drive or from the brake to the planetary transmission, and there possibly produce resonance vibrations with noise emission. Here the portion of the input shaft on the side of the sun gear is supported over a fixed ball bearing in the planet carrier of the second planetary gear set. The radial bearing play can be adapted to the needed space of movement of the sun gear. The input sun gear can, within the bearing play and due to swingings within the clutch play, freely adjust itself between the planetary gears. Thereby a good load balance with satisfactory smooth running is ensured even when the sun gear is built as one piece with the input shaft in order to obtain a great reduction ratio. The adaptability of the input sun gear is therefore of special importance, since the planet carrier of the input planetary gear set rests only axially over radial ball bearings on the planet carrier of the second planetary gear set locked on the housing, the axial bearings being conveniently under spring preload in order to prevent noises. The planet carrier of the input planetary gear set is therefore guided radially by the sun gear of the second planetary gear set and by the ring gear of the input planetary gear set and thus, as result of the manufacturing imprecisions, will rarely assume the precalculated position.

By a precise and strong support of the housing case with which tilting torques are to a great extent avoided, it is prevented that disturbing stresses and torques originating from the load induce noise-emitting vibrations in the drive. The mounting simultaneously absorbs the axial thrusts of the ring gear of the input planetary gear set.

According to another embodiment of the invention, it is proposed that the brake be designed as dry disc brake placed in a separate brake housing serving as frame on which is mounted, on one end face, the engine and on the other front face the planetary transmission with the planet carrier of the second planetary gear set, and which has between the brake and the planetary transmission a support wall in which the portion of the input shaft that is on the brake side is supported axially fixed, the shaft design being sealed by a gasket. By the separate mounting of the brake disc and axial coupling of the transmission and of the engine, it is prevented that brake vibrations possibly occurring due to unevenness of the brake disc or unbalances be transmitted to the remaining power train. The assembly and simple design are improved by the fact that the input shaft is divided in three and the central portion is connected by a drag section with the portion on the side of the sun gear and is mounted by means of a flange on the brake disc carrier which forms a coupling toward the portion on the engine side.

The claims contain a logical combination of the features for solution of the problem, but of course other combinations are easily possible for the expert within the scope of the invention, especially when under given conditions he attaches a greater importance to the building expenses, the assembling, or the noise level.

The drawing shows an embodiment of the invention.

BRIEF DESCRIPTION OF THE DRAWING

The figure shows a partial longitudinal section through a lifting equipment drive according to the invention insofar as it is required for understanding of the invention.

DESCRIPTION OF THE PREFERRED EMBODIMENT

The lifting equipment drive, according to the invention, essentially comprises an engine 1, as a rule an electromotor, a brake 2 and a planetary transmission 3. A brake housing 4 is, at the same time, designed as frame and is secured by means of bolts 5. The engine 1 and the planetary transmission 3 are mounted to the brake housing 4 on opposite end faces. An input shaft, which passes through the brake housing 4, comprises three parts 6, 7 and 8 that are interconnected at 9 and 10. The central part 7 is connected with the external part 8 via a spline section 10 comprising a brake disc carrier 11 on which is formed a brake disc 12 in one piece. The brake disc carrier is mounted by means of bolts 13 to a flange 14 of the central part 7 of the input shaft. The brake disc operates together with brake shoes and control elements, not shown in detail, which are fastened in the brake housing.

The brake housing 4 has, on the transmission side, a support wall 15 in which the central part 7 of the input shaft is axially fixedly supported by means of a radial bearing hole ball bearing 16. The bearing hole 17 is sealed toward the brake disc 12 by a shaft gasket 18.

The planetary transmission 3 has two stages, an input planetary gear set being formed by a sun gear 19, a ring gear 20 and planets 21 supported on a planet carrier 22, while a second planetary gear set forms a second planetary stage with a sun gear 23, a ring gear 24 and planets 25.

The planets 25 are supported on a planet carrier 26 which, at the same time, forms an end face termination of transmission housing 27 and is mounted to the brake housing 4. A housing case 28 of the transmission housing 27 has a mounting flange 29 for lifting equipment such as a wire rope pulley not shown in detail. The mounting flange 29 is situated axially between two spaced taper roller bearings 30 and 31 of the housing case 28. The ring gears 20 and 24 are fastened to the housing case 28. A cover 31, held in the housing case 28 by a snap ring 32, closes the housing case 28 on the free end face thereof.

The external part 8 of the input shaft is supported within the planet carrier 26 by means of a ball bearing 33 axially locked by snap ring 34. The sun gear 19 is integrally formed on the external part 8 of the input shaft. It can freely adjust itself between the planets 21 of the input planetary gear set within the bearing play of the ball bearing 33 and within the free swivel angle of the external part 8 of the input shaft. The planet carrier 22 of the input planetary gear set is connected with the sun gear 23 of the second planetary gear set and, over the first and second radial ball bearings (35, 36), rests axially both on the cover 31 and, via the sun gear 23, on the planet carrier 26 of the second planetary gear set. A plate spring 37 is inserted between the cover 31 and the ball bearing 35 in order to produce an axial preload.

While the second planetary gear set is straight cut and has been subjected to an adequate heat treatment for absorbing high stresses and torques, the gears of the input planetary gear set are helical cut and made with extreme precision, it being possible to omit a heat treatment to avoid distortions or to conduct the heat treatment only at low temperatures. The high precision thereby obtained produces a very smooth running of the input planetary gear set despite high speeds, while the high torques in the second planetary gear set are satisfactorily tolerated without additional axial stresses being produced.

We claim:

1. A drive device for a lifting mechanism comprising:
   an input planetary gear set comprising a sun gear, a planet carrier, carrying rotatable planet gears, and a ring gear;
   a second planetary gear set comprising a sun gear, a planet carrier, carrying rotatable planet gears, and a ring gear;
   an input shaft, having a brake mounted thereon, drivingly connected to the sun gear of said input planetary gear set, the planet carrier of said input planetary gear set being fixedly connected with the sun gear of said second planetary gear set, said ring gears of said input planetary gear set and of said second planetary gear set being connected with a rotatable housing case encasing said input and said second planetary gear sets, and the planet carrier of said second planetary gear set supporting two spaced bearings which, in turn, support said rotatable housing case,
   wherein said input planetary gear set (19, 20, 21) is a helical cut gear set and said second planetary gear set (23, 24 25) is a straight cut gear set, said input shaft (7, 8), between the sun gear of said input planetary gear set (19, 20 21) and said brake (2), is formed from at least a central part (7) having first and second ends and an external part (8) which is connected to the sun gear, the first end of the central part is connected to the external part by a spline connection, and the external part (8) adjacent the sun gear is supported by the planet carrier (26) of the second planetary gear set via a bearing (33).

2. A drive device according to claim 1, wherein a mounting flange (29), for engaging lifting equipment, is secured to an exterior surface of said housing case (28) between the two spaced bearings which support said housing case (28), and
   said each said bearings is a tapered roller bearing.

3. A drive device according to claim 1, wherein only the sun gear, the plant gears, and the ring gear of said second planetary gear set are finished by heat treatment at a high temperature.

4. A drive device according to claim 1, wherein the planet carrier (22) of said input planetary gear set rests axially against a cover (31), via a first radial ball bearing (35), and the sun gear (23) of said second planetary gear set rests axially against said planet carrier (26), via second radial ball bearing (36).

5. A drive device according to claim 4, wherein said first and second radial ball bearings (35, 36) operate as axial bearings and are under a spring pre-load.

6. A drive device according to claim 1, wherein said brake (2) comprises a dry disc brake situated in a separate brake housing (4), said brake housing (4) comprises a frame for connecting an engine (1), for driving the drive device, to said input shaft, said brake housing (4) further secures the planetary carrier (26) of said second planetary gear set to a second opposite surface of said brake housing (4), and a support wall (15), located between said brake disc (12) and said input and second planetary gear sets, has a bearing hole (17) in which the central part (7) of the input shaft is supported at an axially fixed position via a bearing hole bearing (16), and the bearing hole (17) is sealed by a shaft gasket (18).

7. A drive device according to claim 6, wherein said input shaft further comprises an inner part (6) connected to the second end of the central part (7) and to said engine, the second end of the central part (7) also is connected to a brake carrier (11) by means of a flange (14).

* * * * *